United States Patent [19]

Kneip

[11] 4,050,838
[45] Sept. 27, 1977

[54] ARRANGEMENT FOR DRILLING HOLES TO APPLY BUILDERS' HARDWARE ON WINDOWS

[76] Inventor: Jakob Kneip, Haus near 32, 5401 Mermuth, Germany

[21] Appl. No.: 627,044

[22] Filed: Oct. 30, 1975

[51] Int. Cl.² ............................................. B23B 39/18
[52] U.S. Cl. .................................................... 408/46
[58] Field of Search ...................... 408/43, 46, 48, 42, 408/51, 52; 33/45, DIG. 7

[56] References Cited

U.S. PATENT DOCUMENTS

| | | | |
|---|---|---|---|
| 658,670 | 9/1900 | Nash | 408/46 |
| 1,180,280 | 4/1916 | Barnes | 408/48 X |
| 1,228,110 | 5/1917 | Hanson | 408/46 |
| 1,710,744 | 4/1929 | Roe | 408/46 X |
| 2,789,598 | 4/1957 | Berger | 408/46 X |
| 2,890,730 | 6/1959 | Gottlieb | 408/46 X |
| 3,529,496 | 9/1970 | Haley | 408/46 X |
| 3,682,560 | 8/1972 | Suizu | 408/46 |
| 3,749,507 | 7/1973 | Haley | 408/46 |

Primary Examiner—Ronald J. Shore
Assistant Examiner—William R. Briggs
Attorney, Agent, or Firm—Max Fogiel

[57] ABSTRACT

An arrangement for the drilling of holes to apply builders' hardware to windows in which an upper locating rail for accommodating a window frame is located between side members of a framework. A fixed drilling assembly with several spindles is located above the center of the locating rail. The spindles from the drilling assembly are lowerable. Two pipes above and parallel to the locating rail carry two auxiliary drilling assemblies which are coupled by a cable connection. The auxiliary drilling assemblies have several lowerable spindles and can be moved synchronously in opposite directions on the pipes.

10 Claims, 4 Drawing Figures

ARRANGEMENT FOR DRILLING HOLES TO APPLY BUILDERS' HARDWARE ON WINDOWS

BACKGROUND OF THE INVENTION

The present invention relates to a device for the drilling of holes for builders' hardware on windows.

In order to mount various types of builders hardware on the blind frame and the sash or casement frame of a window, it is necessary to make holes or cutouts on the associated locations on the frames. It is already known in the art, how to provide holes or cutouts, by marking by hand on the frame the locations to be drilled or milled from the center of the frame by means of a ruler and then making the holes by means of a drill or a milling head. Such production is extremely unpractical, since each frame requires anew a marking of the hole centers. Due to the not always accurate application of the ruler, this leads necessarily to inaccuracy of the marked locations. In addition, the frames must be transported to the individual drilling or milling assemblies and this requires considerable time. Furthermore, with this conventional type of manufacture, rational mass production of windows is impossible.

It is, therefore, an object of the present invention to provide a device of the above-mentioned construction of simple design, to avoid marking the individual holes by means of a ruler, to make certain of the required center-to-center distance, and to eliminate transport during the manufacturing process.

Another object of the present invention is to provide a device of the foregoing character which can be economically fabricated and maintained in operating service.

A further object of the present invention is to provide a device, as described, which has a substantially long operating life.

SUMMARY OF THE INVENTION

The objects of the present invention are achieved by providing that between the side members of a framework, an upper locating rail for accommodating a blind or sash (casement) frame is located. A fixed drilling assembly with several spindles, which can be lowered, is located above the locating rail at its center. Furthermore, above and parallel to the locating rail, there are two pipes on which drilling assemblies, coupled via a cable connection, with several spindles, which can be lowered, can be moved (shifted) in mutually opposite directions. In a further improvement of the present invention, there are assigned to the movable drilling assemblies each a stop for the blind frame and a stop for the sash (casement) frame, with the stops for the sash (casement) frame capable of being turned up (tilted up).

In order to facilitate the marking for certain types of hardware, for example the turn-tilt-lock, in accordance with a further improvement of the present invention, there is located underneath the upper locating rail a rotary marking and layout angle gage which can be moved along a pipe. This gage can be set against pins inserted at predetermined intervals in the locating rail.

The advantages achieved with the present invention are that, based on the synchronous mutually opposite movability of the drilling assemblies coupled via a cable connection, the center-to-center distance of the drill holes is always assured without marking and layout. In addition, transport of the frames to the various drilling assemblies becomes unnecessary. Furthermore, many frames can be drilled within a relatively short period of time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
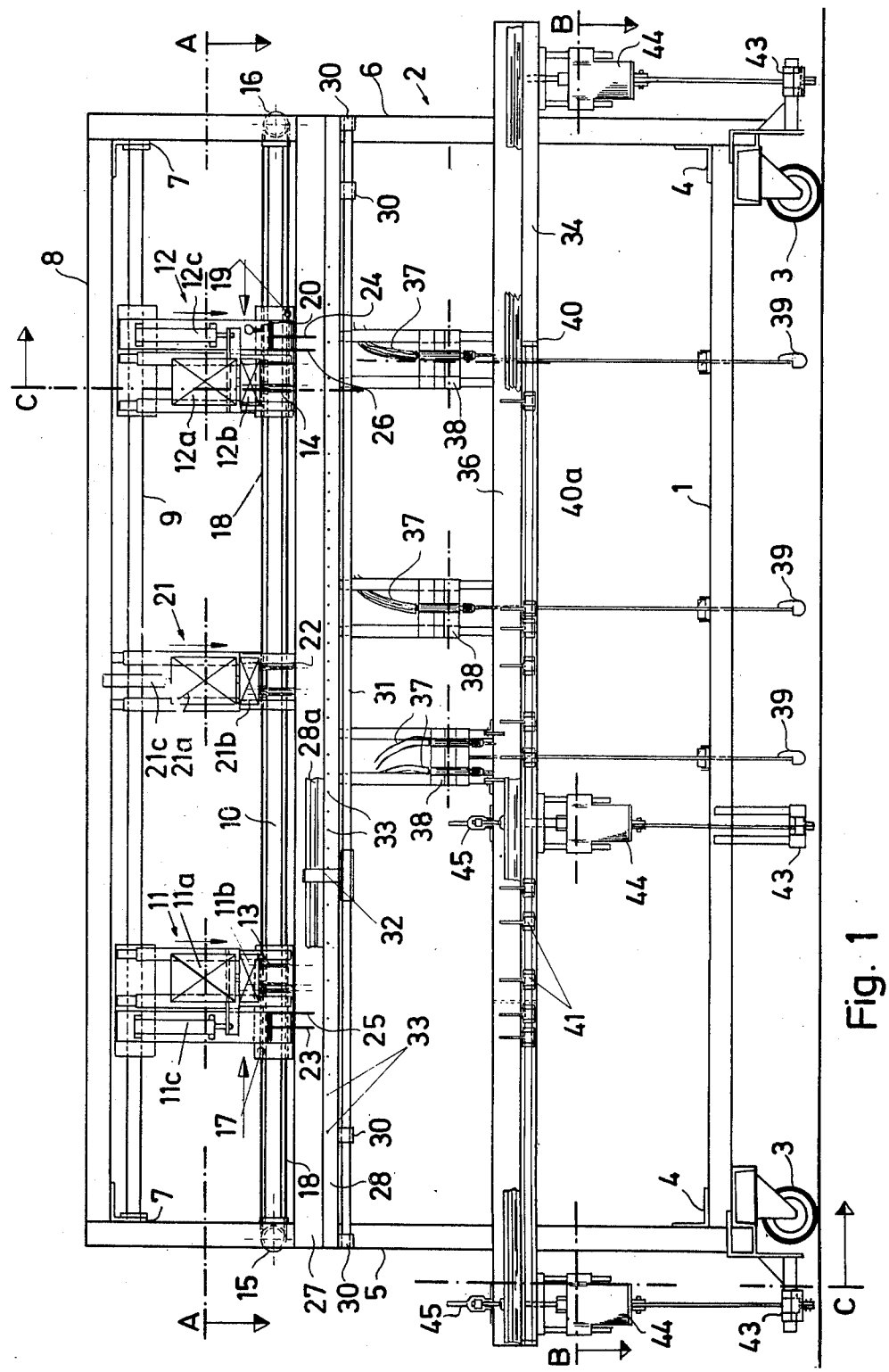
FIG. 1 is a front view of the device, in accordance with the present invention.
Figure 2:
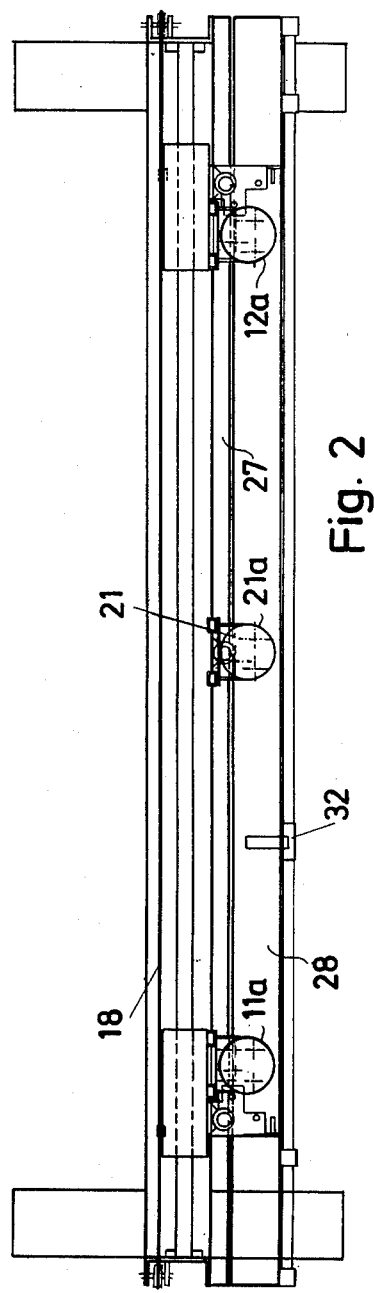
FIG. 2 shows a section taken along line A—A of FIG. 1.
Figure 3:
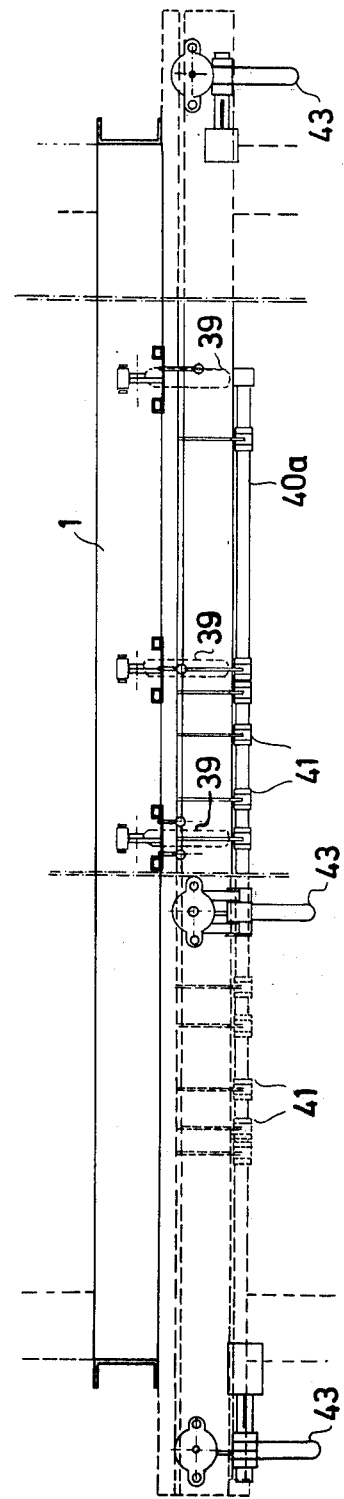
FIG. 3 shows a section taken along line B—B of FIG. 1.
Figure 4:
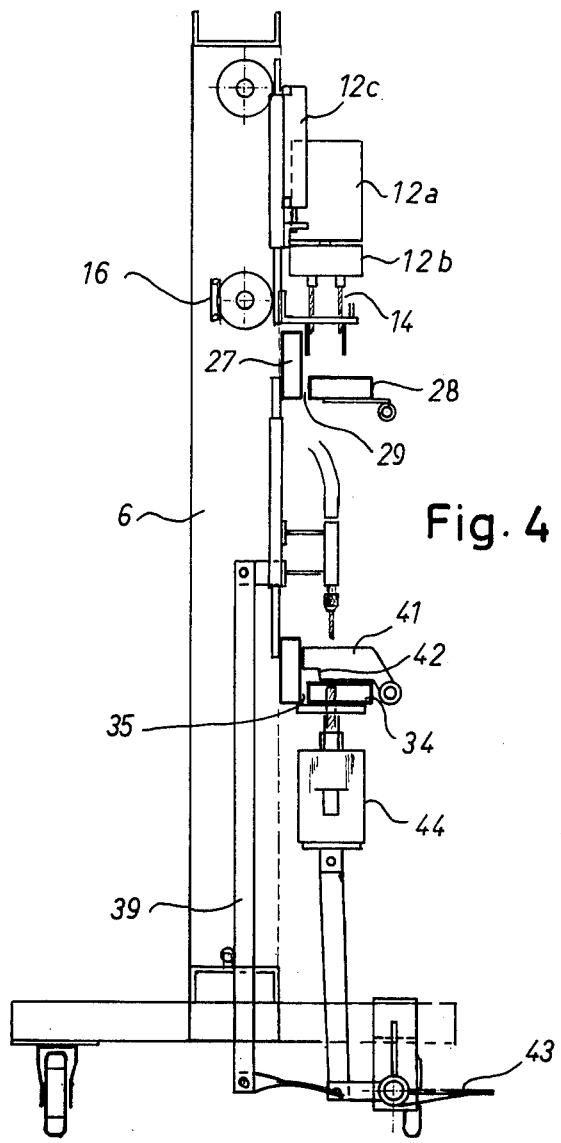
FIG. 4 shows a section taken along line C—C of FIG. 1.

The double-T shaped base frame 1 of framework 2 is supported at its extreme ends on four self-aligning roller bearings 3 which are lockable in a manner already known. The base frame 1 is connected to side members 5, 6 by angle irons 4. A cross connection 8, fastened via angle irons 7, is connected to the upper ends of side members 5, 6. Underneath the cross connection 8, between side members 5, 6, two parallel pipes 9, 10 are located, on which two drilling assemblies 11, 12 with several spindles 13, 14 (which can be lowered) can be slid back and forth. Drilling assembly 11, consisting mainly of electric drive motor 11a and the power transmission 11b, can be moved by means of compressed-air cylinder 11c. Drilling assembly 12, consisting of electric drive motor 12a and power transmission 12b, can be moved by means of compressed-air cylinder 12c. Pipe 10 is assigned a guide roller 15 in side member 5 and a guide roller 16 in side member 6. On drilling assembly (set) 11, at fastening point 17, a cable 18 is fastened which passes above pipe 10 to guide or deflection roller 15 and from there underneath pipe 10 to fastening point 19 on the drilling assembly or set 12. From fastening point 19, the cable 18 runs via guide or deflection roller 16 back to fastening point 17 of drilling assembly 11. This cable connection of drill assemblies 11, 12 brings about that, when the drill assembly 12 is moved by means of handle 20, there always takes place a synchronous displacement of the drilling assemblies 11, 12 towards or away from drilling assembly 21 fixedly mounted in the middle between the two pipes 9, 10 and equipped with several spindles 22 that can be lowered. Drill assembly 21, consisting mainly of electric drive motor 21a and power transmission 21b, can be shifted by means of compressed-air cylinder 21c. Drilling assemblies 11, 12 are assigned a stop 23, 24 for a blind frame and a stop 25, 26 for a window sash (casement), with the stops capable of being turned up.

Underneath pipe 10, there is mounted on side members 5, 6 a striker bar 27 to which at right angles, a locating bar 28 for the blind and sash frames of windows is assigned. This locating rail 28 is in contact with part 28a of a blind frame. Between the striker bar 27 and this upper locating rail 28 is an air gap 29 for the easy removal of shavings. To locating rail 28 and side members 5, 6 there is connected via clamp 30, a pipe 31 on which is located a movable rotary marking and layout angle gage 32 which can be placed at certain intervals against pins 33 inserted in the upper locating rail 28.

A bottom locating rail 34 extends across side members 5, 6. Leaving an air gap 35, this locating rail 34 is assigned a striker bar 36. Between upper locating rail 28 and striker bar 36, several drill heads, which can be lowered and are driven via flexible shafts 37, are inserted. The individual drive assemblies of the flexible shafts 37 are not shown in detail. The drill heads 38 can be actuated through associated footswitch levers 39. On the front side of the bottom locating rail 34, there is connected via clamp 40 a pipe 40a on which several stops 41 are located which can be turned (tilted) up and whose end position can be moved. On their end, these stops 41 have a recess 42 to assure accurate location of the blind and sash (casement) frames. In addition, there are assigned to the bottom locating rail from the bottom side several drilling or milling assemblies which can be moved up and down by foot switch levers 43. Facing these drilling or milling assemblies 44, a clamping device 45 for the blind or window sash (casement) frames is located on striker bar 36.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

I claim:

1. An arrangement for drilling holes to apply builders' hardware to windows comprising, in combination, a framework with two sides members; an upper mounting rail between said side members for receiving a blind or sash frame of a window; a stop rail attached to said mounting rail; fixed drilling means having two drilling units and a plurality of lowerable spindles above said mounting rail and at the center thereof; two tubular members above and parallel to said mounting rail; two auxiliary drilling units with a plurality of lowerable spindles on said tubular members and movable synchronously in opposite directions; cable connecting means connecting said two auxiliary drilling units so that movement of one of said auxiliary drilling units displaces the other auxiliary unit synchronously in the opposite direction, displacements of said auxiliary drilling units being relative to said fixed drilling means; linear displacement of one auxiliary drilling unit being transmitted directly through said cable connecting means to the other auxiliary unit for displacing said other auxiliary unit synchronously in the opposite direction, said cable connecting means comprising two runs of cable, each run being movable in opposite direction, each drill unit being attached to a separate run; first stop means abutted by said auxiliary drilling unit when drilling holes for a blind frame; and second stop means abutted by said auxiliary drilling unit when drilling for a sash and casement window frame, said second stop means being tiltable upward.

2. The arrangement as defined in claim 1 including a bottom mounting rail beneath said upper mounting rail and projecting beyond said side members of said framework; and a plurality of drill heads on said bottom mounting rail and driven by flexible shaft means.

3. The arrangement as defined in claim 2 including foot switch lever means for actuating said drill heads.

4. The arrangement as defined in claim 2 including a first striker bar spaced by an air gap from said upper mounting rail; and a second striker bar spaced by an air gap from said bottom mounting rail.

5. The arrangement as defined in claim 1 including self-aligning lockable roller bearings supporting said framework.

6. An arrangement for drilling holes to apply builders' hardware to windows comprising, in combination, a framework with two side members; an upper mounting rail between said side members for receiving a frame of a window; fixed drilling means having two drilling units and a plurality of lowerable spindles above said mounting rail and at the center thereof; two tubular members above and parallel to said mounting rail; two auxiliary drilling units with a plurality of lowerable spindles on said tubular members and movable synchronously in opposite directions; cable connecting means connecting said two auxiliary drilling units so that movement of one of said auxiliary drilling units displaces the other auxiliary unit synchronously in the opposite direction, displacements of said auxiliary drilling units being relative to said fixed drilling means, said cable connecting means comprising two runs of cable, each run being movable in opposite direction, each drill unit being attached to a separate run; a rotary marking and layout angle gage beneath said upper mounting rail; an auxiliary tubular member supporting said gage, said gage being movable along said auxiliary tubular member; and pins means inserted at predetermined intervals in said mounting rails, said gage being settable against said pin means.

7. An arrangement for drilling holes to apply builders' hardware to windows comprising, in combination, a framework with two side members; an upper mounting rail between said side members for receiving a frame of a window; fixed drilling means having two drilling units and a plurality of lowerable spindles above said mounting rail and at the center thereof; two tubular members above and parallel to said mounting rail; two auxiliary drilling units with a plurality of lowerable spindles on said tubular members and movable synchronously in opposite directions; cable connecting means connecting said two auxiliary drilling units so that movement of one of said auxiliary drilling units displaces the other auxiliary unit synchronously in the opposite direction, displacements of said auxiliary drilling units being relative to said fixed drilling means, said cable connecting means comprising two runs of cable, each run being movable in opposite direction, each drill unit being attached to a separate run; a bottom mounting rail beneath said upper mounting rail and projecting beyond said side members of said framework; a plurality of drill heads on said bottom mounting rail and driven by flexible shaft means; foot switch means for actuating said drill heads; a plurality of machining units on the lower side of said bottom mounting rail; and auxiliary foot switch lever means for moving said machining units in upward and downward direction.

8. The arrangement as defined in claim 7 including a striker bar on said bottom mounting rail; and clamping means fastened to said striker bar and facing said machining unit for clamping said window frame.

9. An arrangement for drilling holes to apply builders' hardware to windows comprising, in combination, a framework with two side members; an upper mounting rail between said side members for receiving a frame of a window; fixed drilling means having two drilling units and a plurality of lowerable spindles above said mounting rail and at the center thereof; two tubular members above and parallel to said mounting rail; two auxiliary drilling units with a plurality of lowerable spindles on said tubular members and movable synchronously in opposite directions; cable connecting means connecting said two auxiliary drilling units so that movement of one of said auxiliary drilling units displaces the other auxiliary unit synchronously in the opposite direction, displacements of said auxiliary drilling units relative to said fixed drilling means, said cable connecting means comprising two runs of cable, each run being movable in opposite direction, each drill unit being attached to a separate run; a bottom mounting rail beneath said upper mounting rail and projecting beyond said side members of said framework; a plurality of drill heads on said bottom mounting rail and driven by flexible shaft means; an auxiliary tubular member in front of said bottom mounting rail; a plurality of stops on said auxiliary tubular member and tiltable upward, said plurality of stops being movable on said auxiliary tubular member.

10. An arrangement for drilling holes to apply builders' hardware to windows comprising, in combination, a framework with two side members; an upper mounting rail between said side members for receiving a frame of a window; fixed drilling means having two drilling units and a plurality of lowerable spindles above said mounting rail and at the center thereof; two tubular members above and parallel to said mounting rail; two auxiliary drilling units with a plurality of lowerable spindles on said tubular members and movable synchronously in opposite directions; cable connecting means connecting said two auxiliary drilling units so that movement of one of said auxiliary drilling units displaces the other auxiliary unit synchronously in the opposite direction, displacements of said auxiliary drilling units being relative to said fixed drilling means, said cable connecting means comprising two runs of cable, each run being movable in opposite direction, each drill unit being attached to a separate run; first stop means abutted by said auxiliary drilling unit when drilling for a blind frame; second stop means abutted by said auxiliary drilling units when drilling for a sash and casement frame, said first and second stop means being tiltable upward; a rotary marking and layout angle gage; an auxiliary tubular member supporting said gage, said gage being movable along said auxiliary tubular member; pin means at predetermined intervals along said mounting rail; said gage being settable against said pin means; a bottom rail beneath said upper rail and projecting beyond said side members of said framework; a plurality of drill heads driven by flexible means and being lowerable on said bottom rail; foot switch lever means for actuating said drill heads; machining unit on said bottom rail and on the under side thereof; auxiliary foot switch lever means for moving said machining unit in upward and downward directions; a first striker bar on said bottom mounting rail; clamping means fastened to said first striker bar and facing said machining units; a further tubular member in front of said bottom mounting rail; a plurality of stops on said further tubular member and tiltable upwards, said stops being movable on said further tubular member; a second striker bar spaced by an air gap from said upper mounting rail, said first striker bar being spaced by an air gap from said bottom mounting rail; and self-aligning lockable roller bearings for supporting said framework.

* * * * *